(12) United States Patent
Fung et al.

(10) Patent No.: US 11,576,525 B2
(45) Date of Patent: Feb. 14, 2023

(54) TEMPERATURE SENSING SYSTEM FOR A COOKING APPLIANCE

(71) Applicants: Kam Fai Fung, Hong Kong (CN); Kin Man Lai, Hong Kong (CN)

(72) Inventors: Kam Fai Fung, Hong Kong (CN); Kin Man Lai, Hong Kong (CN)

(73) Assignee: Conair LLC, Stamford, CT (US)

( * ) Notice: Subject to any disclaimer, the term of this patent is extended or adjusted under 35 U.S.C. 154(b) by 456 days.

(21) Appl. No.: 16/149,656

(22) Filed: Oct. 2, 2018

(65) Prior Publication Data
US 2019/0099036 A1    Apr. 4, 2019

Related U.S. Application Data

(62) Division of application No. 13/957,856, filed on Aug. 2, 2013, now Pat. No. 10,130,205.

(51) Int. Cl.
| A47J 36/32 | (2006.01) |
| A47J 37/06 | (2006.01) |
| A23L 5/10  | (2016.01) |

(52) U.S. Cl.
CPC .............. *A47J 36/32* (2013.01); *A23L 5/10* (2016.08); *A47J 37/0611* (2013.01)

(58) Field of Classification Search
CPC ...... A47J 37/0611; A47J 37/06; A47J 27/212; A47J 2202/00; A47J 43/28; A47J 37/0688; A47J 36/32; A47J 36/321; A47J 27/62; A47J 37/10; A47J 36/00; A47J 27/004; A47J 27/00; A47J 27/56; A47J 37/0704; A47J 37/07; A47J 45/068; A47J 45/00; A47J 45/06; A23L 1/01; A23L 5/10; A23L 3/005; H05B 1/0266; H05B 1/02; G08C 17/02; G01K 11/02; G01K 11/00; G01K 1/14; G01K 13/02; G01K 13/00; G01K 13/10; G01K 1/16; G01K 7/06; Y10T 137/7801; Y10T 16/44; Y10T 16/487; Y10T 16/444; G05D 23/24; G05D 23/1917; G05D 23/20; A21C 1/145; B01F 15/0408; B01F 2003/1257; B01F 15/04; B01F 3/12; F27D 11/00; Y10S 220/912
USPC ....... 426/523, 231, 232, 410, 392, 233, 438, 426/509, 58, 614, 637, 244, 234, 107; 99/349, 372, 422, 379, 389, 391, 325,
(Continued)

(56) References Cited

U.S. PATENT DOCUMENTS

2,914,644 A * 11/1959 Holtkamp ........ G05D 23/27537
219/413
4,747,712 A * 5/1988 Gonoh ..................... G01K 7/16
219/712
(Continued)

*Primary Examiner* — Phuong T Nguyen
(74) *Attorney, Agent, or Firm* — Grogan, Tuccillo & Vanderleeden, LLP (57) ABSTRACT

A cooking appliance including a temperature sensing system having an upper housing having a first heating surface and a lower housing having a second heating surface includes a temperature sensing probe, a control panel and a control unit in electrical communication with the temperature sensing probe and the control panel. The temperature sensing probe is removably received by the upper housing and extends through the first heating surface. The control panel has one or more input buttons for allowing a user to select at least one input parameter including a desired internal temperature of a food item.

5 Claims, 9 Drawing Sheets

(58) Field of Classification Search
USPC ..... 99/326, 329, 329 R, 328, 330, 334, 348,
99/409, 332, 327, 331, 343, 344, 342,
99/324, 358, 451; 219/490, 385, 386,
219/389, 390, 399, 432, 433, 440, 441;
73/358, 169, 54, 73, 865.5; 374/155,
374/160, 179, 208, 148, 141
See application file for complete search history.

(56) References Cited

U.S. PATENT DOCUMENTS

| | | | | |
|---|---|---|---|---|
| 4,875,782 A * | 10/1989 | Fox | | G01K 1/146 |
| | | | | 374/148 |
| 4,967,049 A * | 10/1990 | Kaneshiro | | G01K 1/00 |
| | | | | 219/712 |
| 5,743,647 A * | 4/1998 | Chen | | A61J 17/103 |
| | | | | 374/151 |
| 6,595,115 B1 * | 7/2003 | Lin | | A47J 37/0611 |
| | | | | 99/331 |
| 6,935,874 B1 * | 8/2005 | Fang | | H01R 13/4534 |
| | | | | 439/924.2 |
| 7,880,487 B2 * | 2/2011 | Petrick | | G01R 1/06788 |
| | | | | 324/754.07 |
| 7,963,215 B2 * | 6/2011 | Ho | | A47J 37/0611 |
| | | | | 99/377 |
| 2004/0074398 A1 * | 4/2004 | Griffin | | A23L 5/15 |
| | | | | 99/342 |
| 2004/0123744 A1 * | 7/2004 | Bobo | | A47J 37/0611 |
| | | | | 99/374 |
| 2010/0006558 A1 * | 1/2010 | McLoughlin | | F24C 7/08 |
| | | | | 219/392 |
| 2011/0177215 A1 * | 7/2011 | Bartlett | | A47J 37/044 |
| | | | | 426/143 |
| 2012/0148713 A1 * | 6/2012 | Owensby | | A23L 5/10 |
| | | | | 426/233 |

* cited by examiner

TEMPERATURE SENSING SYSTEM FOR A COOKING APPLIANCE

CROSS REFERENCE TO RELATED APPLICATION

This application is a divisional of U.S. patent application Ser. No. 13/957,856, filed on Aug. 2, 2013, entitled "TEMPERATURE SENSING SYSTEM FOR A COOKING APPLIANCE", herein incorporated by reference in its entirety.

FIELD OF THE INVENTION

The present invention relates to cooking appliances and, more particularly, to an temperature sensing system for a cooking appliance.

BACKGROUND OF THE INVENTION

Cooking appliances, and in particular electric cooking/grilling devices such as griddles, are known. These grilling devices typically have a lower housing having a lower cooking surface and an upper housing having an upper cooking surface, wherein the cooking surfaces are typically heated by an electrical resistance heater. A handle attached to the upper housing allows a user to raise and lower the upper housing relative to the lower housing to accommodate a food item therebetween to be heated.

While existing grilling devices are generally suitable for what is regarded as ordinary performance, there is room for improvement in terms of convenience, ease of use and increased functionality. As will be readily appreciated, to determine the temperature or doneness of food items, typical grills require a user to open the grill and pause cooking in order to insert a thermometer. In view the tedious nature of this process, there is a need for a cooking appliance that includes a means for measuring the doneness of food items during cooking.

SUMMARY OF THE INVENTION

It is an object of the present invention to provide a cooking appliance having a temperature sensing system.

It is another object of the present invention to provide a temperature sensing system for a cooking appliance for detecting the internal temperature of a food item during cooking.

These and other objects are achieved by the present invention.

According to an embodiment of the present invention, a temperature sensing system for a cooking appliance having an upper housing having a first heating surface and a lower housing having a second heating surface includes a temperature sensing probe, a control panel and a control unit in electrical communication with the temperature sensing probe and the control panel. The temperature sensing probe is removably received by the upper housing and extends through said first heating surface. The control panel has one or more input buttons for allowing a user to select at least one input parameter including a desired internal temperature of a food item.

According to another embodiment of the present invention a cooking appliance is provided. The cooking appliance includes an upper housing having an upper heating surface and a lower housing having a lower heating surface, a temperature sensing probe received by the upper housing and extending through the upper heating surface, a control panel having one or more input buttons for allowing a user to select at least one input parameter, and a control unit in electrical communication with the temperature sensing probe and the control panel. The at least one input parameter includes a desired internal temperature or doneness of a food item.

According to yet another embodiment of the present invention, a method of operating a cooking appliance having an upper heating surface and a lower heating surface is provided. The method includes the steps of equipping the cooking appliance with a control unit and a temperature sensing probe, and operating the upper heating surface and the lower heating surface in dependence upon data from the temperature sensing probe.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
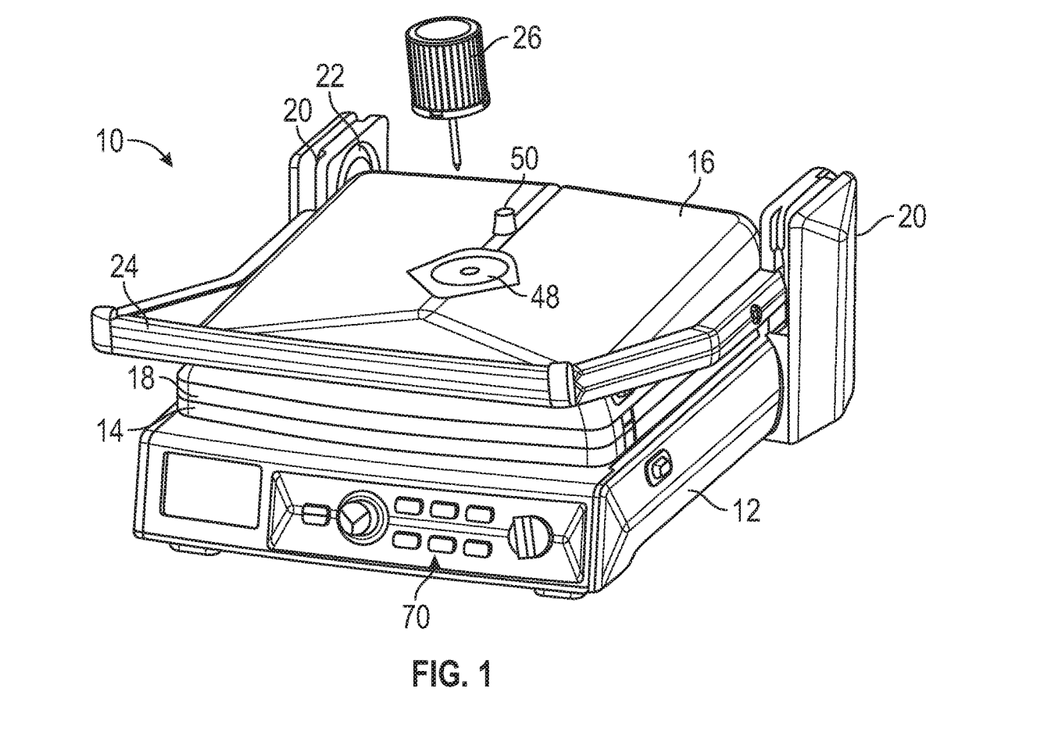
FIG. 1 is a perspective view of a cooking appliance having a temperature sensing probe according to another embodiment of the present invention.
Figure 2:
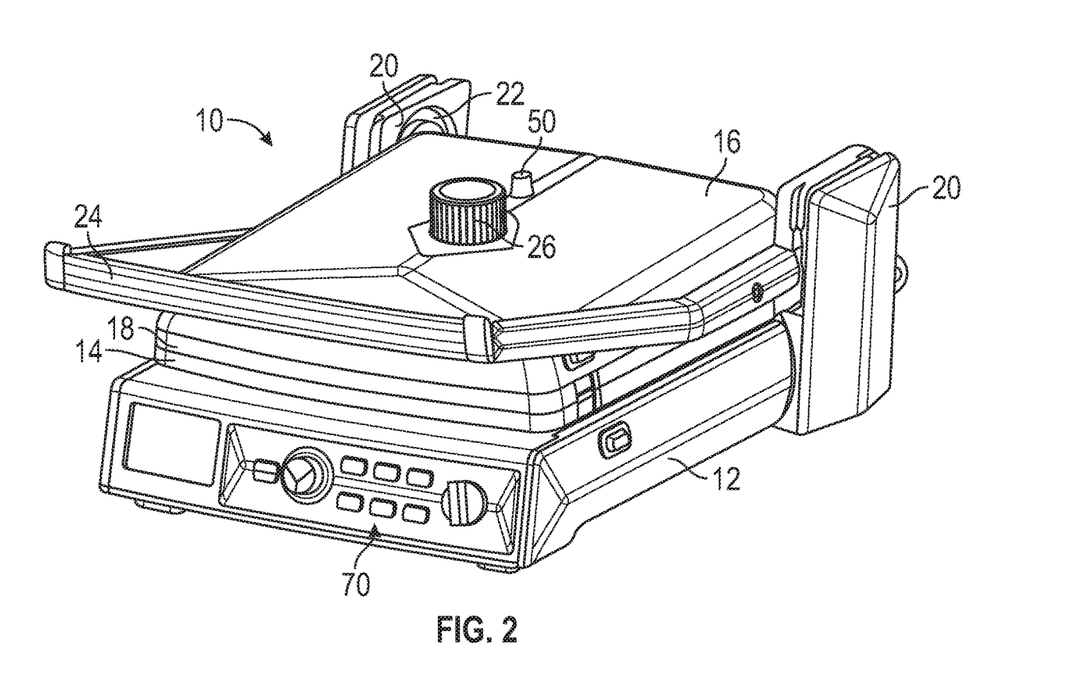
FIG. 2 is another perspective view of the cooking appliance of FIG. 1.

Referring to FIGS. 1 and 2, a cooking appliance 10 according to an embodiment of the present invention is shown. As shown therein, the cooking appliance 10 generally takes the form of a countertop grill and includes a lower housing 12 having a lower heating/cooking plate 14 and an upper housing 16 having an upper heating/cooking plate 18. The upper housing 16 is operatively connected to the lower housing 12 via opposed frame members 20 extending from the lower housing 16. In particular, as shown therein, the upper housing 16 rides in a guide track 22 in the frame members 20. A handle 24 attached to the upper housing 16 allows a user to raise and lower the upper housing 16 in the guide track 22 in order to selectively position the upper housing 16 in various positions in relation to the lower housing 12.

Figure 3:
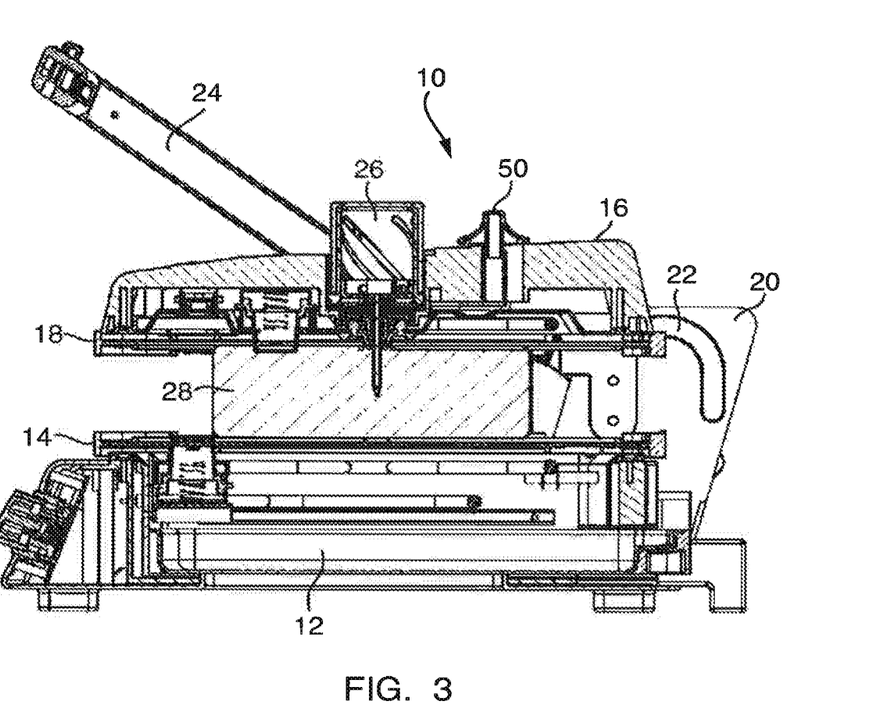
FIG. 3 is a side-cross sectional view of the cooking appliance of FIG. 1.

As best shown in FIGS. 1-3, the cooking appliance 10 also includes a temperature sensing probe 26 that is configured to extend through the upper housing 16 and upper heating plate 18 to selectively penetrate and pierce a food item 28 positioned between the upper and lower heating plates 14, 18. In particular, the temperature sensing probe 26 can be inserted into an aperture 48 formed in the upper housing 16 and upper heating plate 18 in order to pierce a food item 28. The probe 26 may also be locked in place, once inserted, by a lock button 50, as discussed in detail below.

As shown in FIGS. 4-8, the temperature sensing probe 26 includes a probe housing 30 having a piercing shaft 32, a rotatable knob 34 that is substantially cylindrical in shape, and a guide cylinder 36. A temperature sensor 38 is housed within a distal tip of the shaft 32 for sensing the internal temperature of food items. A conductive wire 44 connects the temperature sensor 38 to a pair of terminals 46 in the housing 30.

Figure 6:
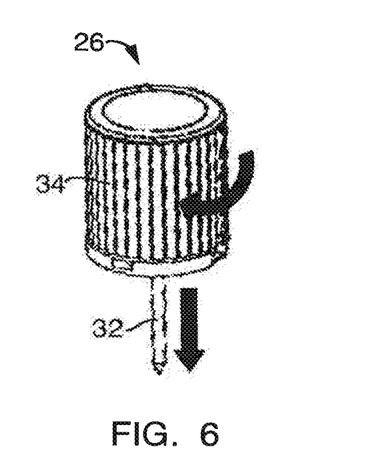
Figure 7:
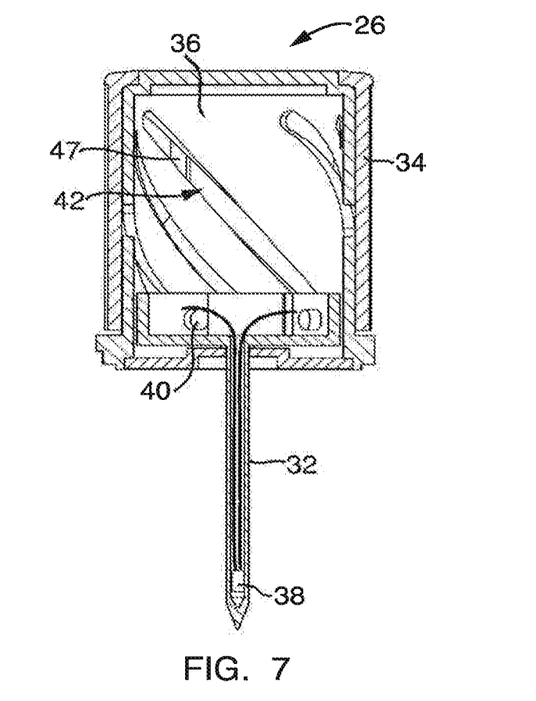
Figure 8:
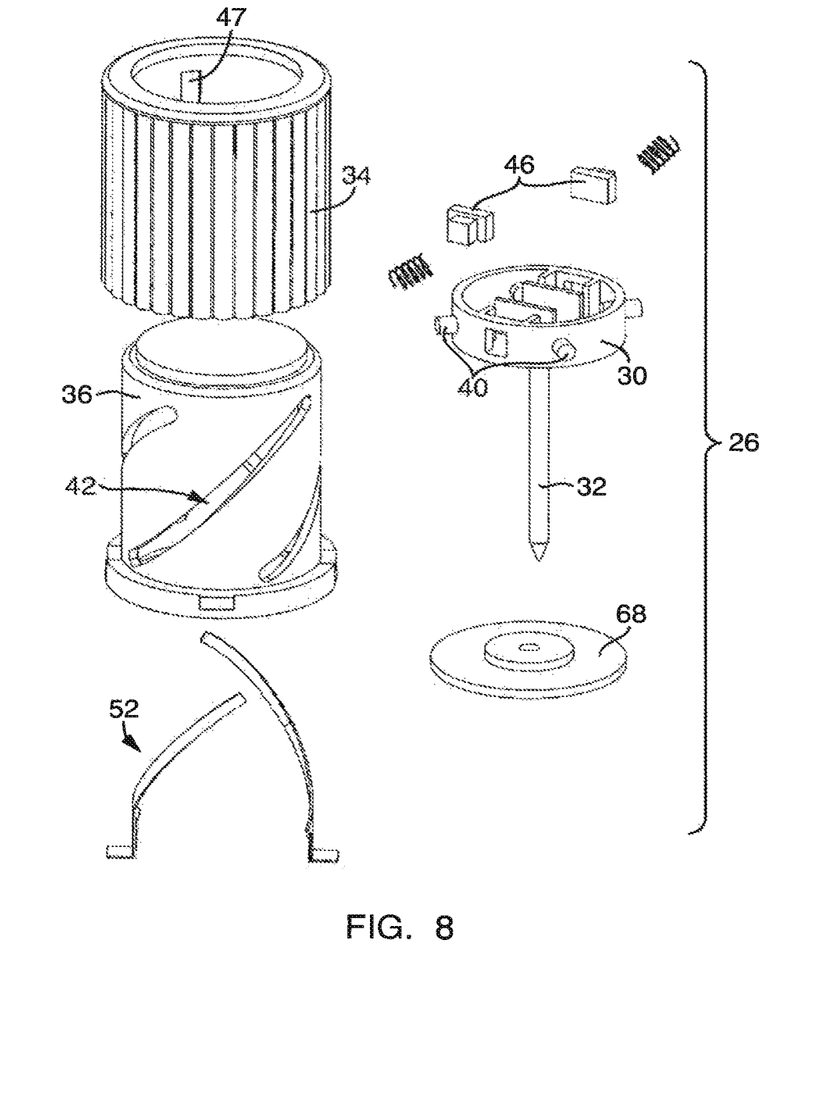
FIG. 8 is an exploded view of the temperature sensing probe of the cooking appliance of FIG. 1.

As also shown in FIGS. 4-8, the probe housing 30 is operatively connected to the guide cylinder 36 via protrusions 40 on the probe housing 30 that are received in angled slots 42 formed in the guide cylinder 36. The guide cylinder 36, in turn, is housed within the rotatable knob 34. The protrusions 40 on the probe housing 30 are also received in substantially vertical grooves 47 formed in the interior of the rotatable knob 34, as best shown in FIG. 8. Importantly, this engagement of the protrusions 40 with knob 34 serves to translate rotation of the knob 34 into corresponding rotation of the probe housing 30.

Figure 4:
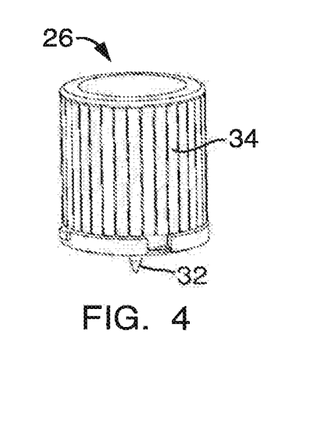
FIGS. 4-7 are various view of the temperature sensing probe of the cooking appliance of FIG. 1.
Figure 5:
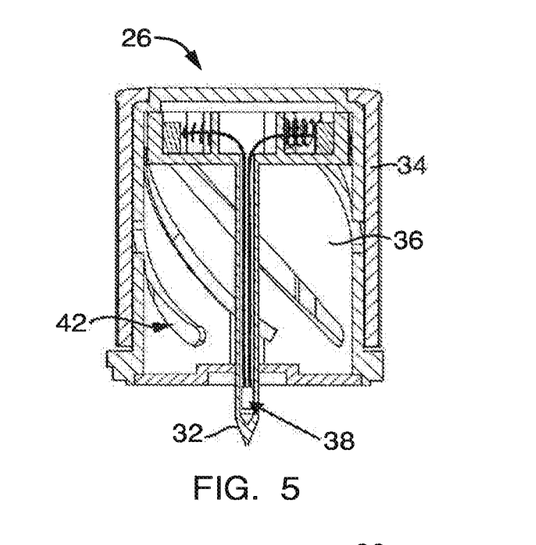

In operation, as the knob 34 is rotated, the probe housing 30 also rotates therewith, due to the engagement of the protrusions 40 on the probe housing with the vertical grooves 47 formed in the knob 34. More specifically, as the knob 34 rotates, the protrusions 40 slide up or down within the vertical groove 47 of the knob 34, and within the angled slots 42 of the guide cylinder 36. This arrangement allows for the selective extension or retraction (depending on the direction of rotation of the knob 34) of the probe housing 30, and thus the piercing shaft 32. FIGS. 4 and 5 illustrate the piercing shaft 32 in a retracted position, while FIGS. 6 and 7 illustrate the piercing shaft 34 in an extended position. In this manner, a user can control the piercing depth of the probe 26 in order to orient the temperature sensor 38 most closely to the middle of the food item 28 being heated.

Figure 9:
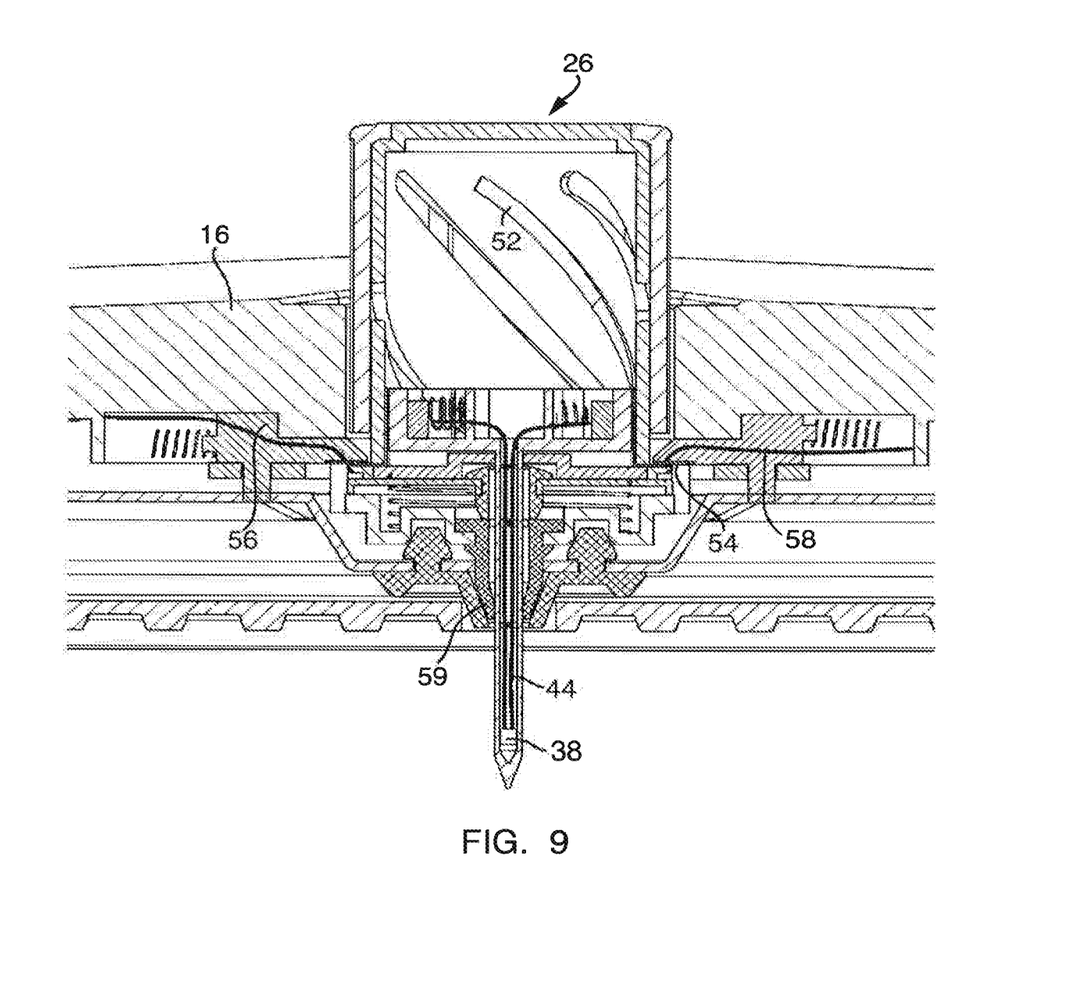
FIGS. 9-15 are various views illustrating operation of the temperature sensing probe of the cooking appliance of FIG. 1.

With reference to FIG. 9, when the temperature sensing probe 26 is positioned in the upper housing 16, a temperature signal is transmitted from the temperature sensor 38 to the printed circuit board (PCB) of a control unit (not shown) housed within the cooking appliance 10. In particular, the temperature sensor 38 is electrically connected to the two terminals 46 via wire 44. These terminals 46 are themselves in contact with a slim conductive strip 52 of the guide cylinder 36. As also shown therein, the slim conductive strip 52 is in contact with a conductive plate 54 of the upper housing 16, which is in contact with terminals 56 in the housing 16. These terminals 56 are electrically coupled to the PCB by conductive wire 58. By way of this conductive pathway, the temperature of a food item is detected by the temperature sensor 38 and is transmitted to the control unit of the cooking appliance 10.

As further shown in FIG. 9, a resilient seal 59 is positioned in the upper housing 16 and surrounds the aperture 48. The seal 59 prevents grease and food from entering the upper housing 106, thereby providing for a degree of cleanliness.

Figure 16:
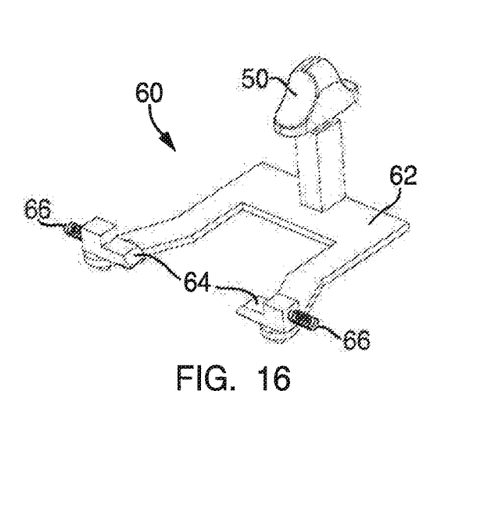
FIG. 16 is a perspective view of a temperature sensing probe locking mechanism of the cooking appliance of FIG. 1.
Figure 17:
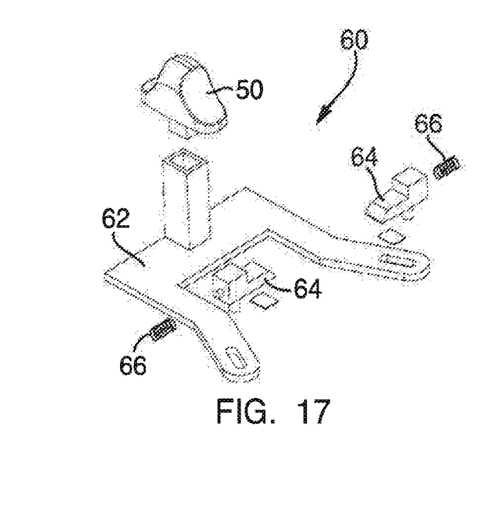
FIG. 17 is an exploded view of the temperature sensing probe locking mechanism of FIG. 16.

As alluded to above, the cooking appliance 10 also includes a locking mechanism 60 for selectively locking the temperature sensing probe 26 in place. As shown in FIGS. 16 and 17, the locking mechanism 60 includes the lock button 50, a substantially U-shaped actuating member 62 connected to the lock button 50, and a pair of sliders 64 each having a spring 66.

Figure 10:
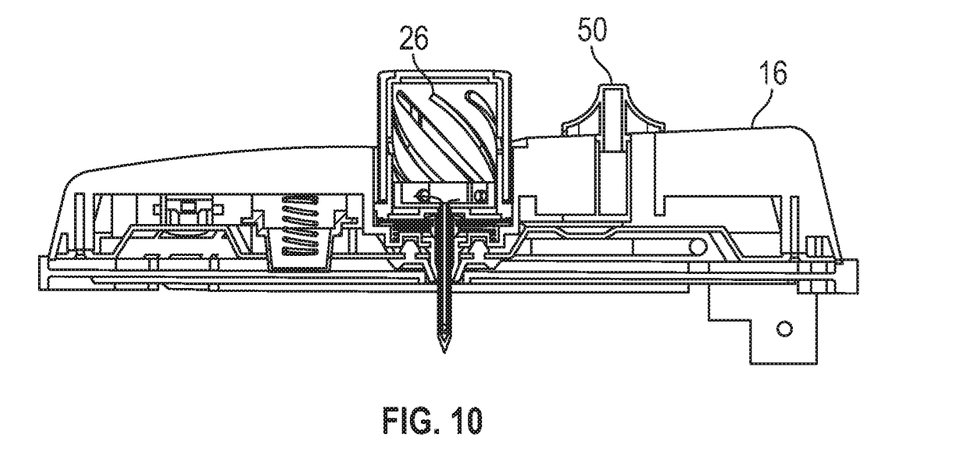
Figure 11:
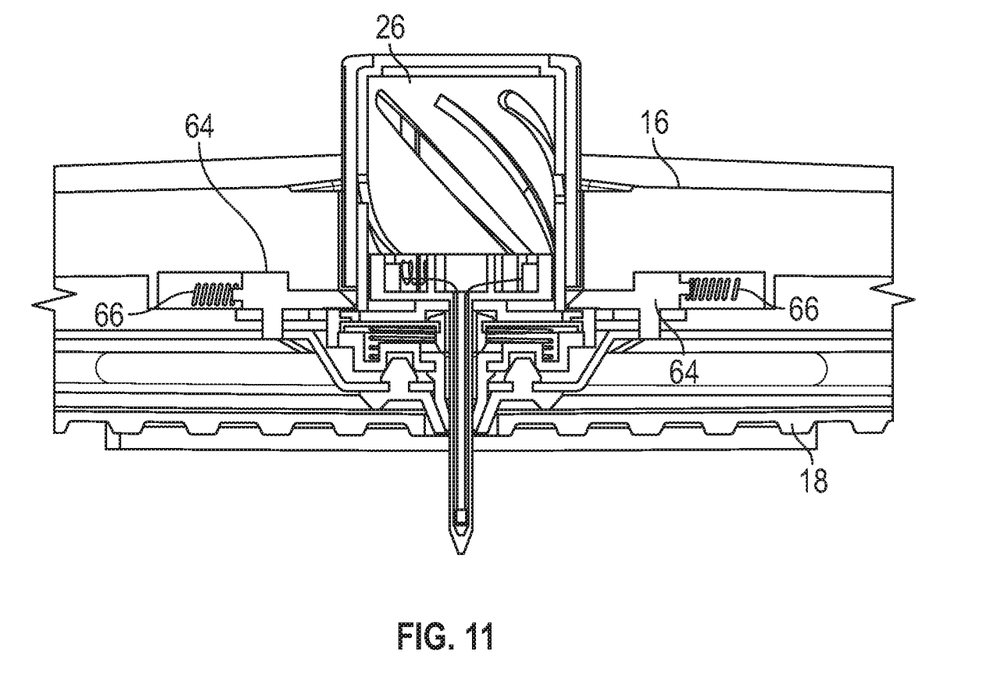
Figure 12:
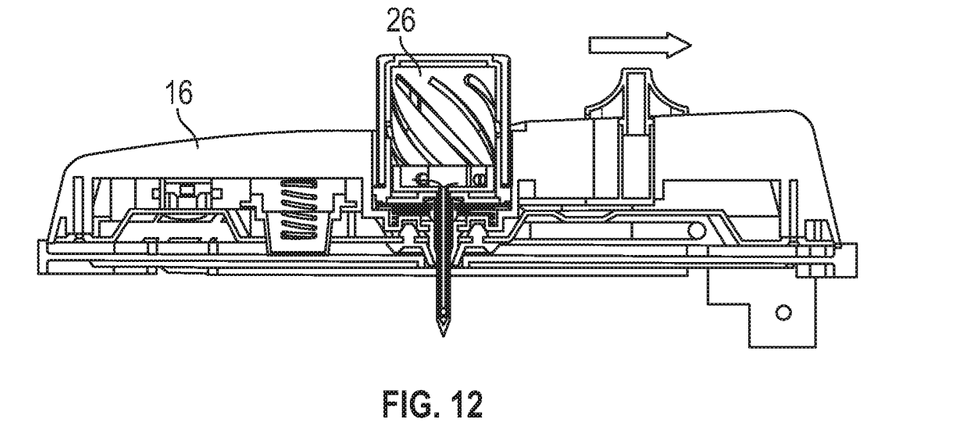
Figure 13:
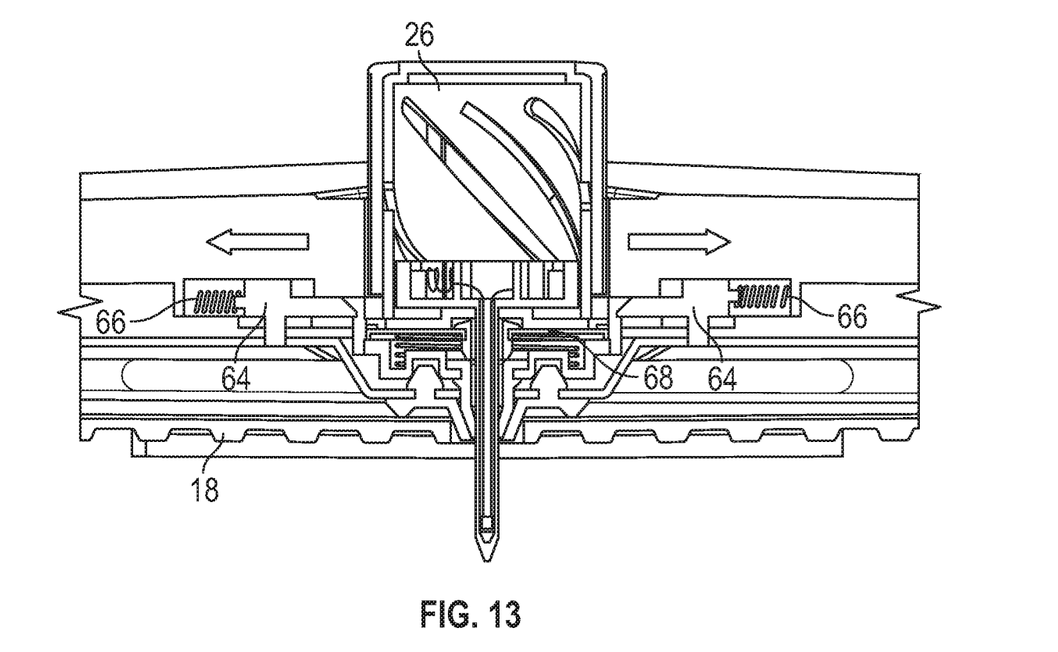
Figure 14:
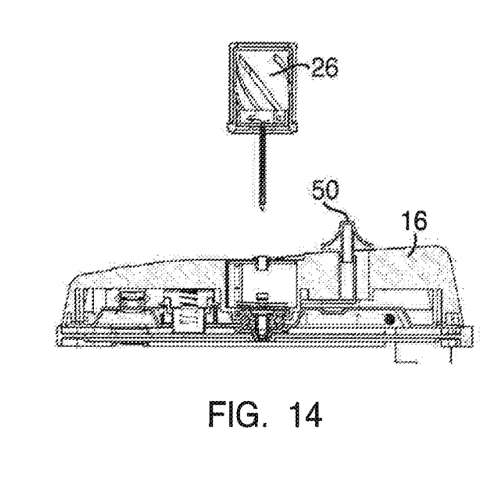
Figure 15:
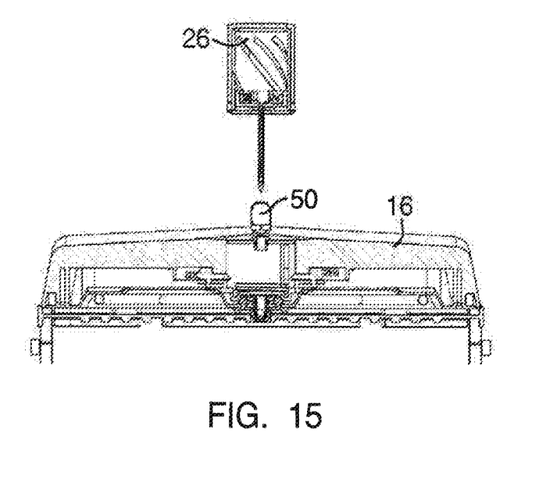

FIGS. 10 and 11 illustrate the temperature probe 26 in a locked position. As shown, the probe 26 is locked in place by the sliders 64. Importantly, as the sliders 64 are spring-biased by springs 66 towards the temperature probe 26, the probe 26 is automatically locked into place when the probe 26 is inserted into the upper housing 16.

FIGS. 12-15, conversely, illustrate unlocking and removal of the temperature sensing probe 26 from the upper housing. As shown therein, movement of the lock button 50 causes the sliders 64 to move against the bias of springs 66 and away from the temperature sensing probe 26. In this position, the temperature sensing probe 26 may be removed from the housing 16, as the sliders 64 are no longer engaged with a retaining plate 68 of the probe 26.

Figure 18:
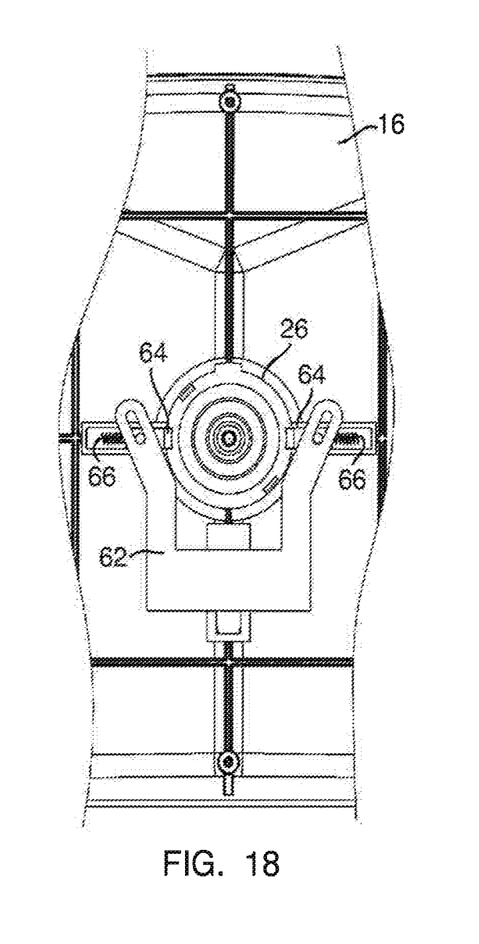
FIG. 18 is a bottom plan view of the locking mechanism of FIG. 16 in a locked position.
Figure 19:
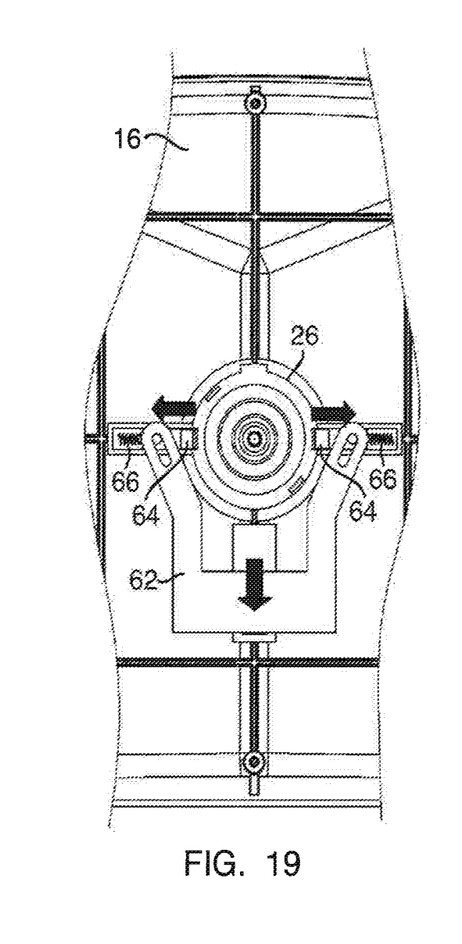
FIG. 19 is a bottom plan view of the locking mechanism of FIG. 16 in an unlocked position.

FIGS. 18 and 19 are bottom views of the upper housing 16 illustrating the locking mechanism 60 in a locked position and unlocked position, respectively.

In the preferred embodiment, the cooking appliance 10 includes a control system that allows a user to precisely control the degree of doneness or temperature of food items. In particular, the control system includes the temperature sensing probe 26 and the control unit, as described above, as well as a control panel 70 on the face of the cooking appliance 10. The control panel 70 includes an array of buttons that allow a user to select and set a variety of cooking or heating parameters. For example, a user can select a desired internal temperature of the food item to be cooked, or a desired degree of doneness. The control unit is configured to control operation of the one or both of the heating plates 14, 18 in dependence upon the preset cooking or heating parameters, and in dependence upon the temperature of a food item detected by the temperature sensing probe 26.

In particular, in operation, a user can select a desired degree of doneness (e.g., rare, medium, well done) utilizing the control panel 70 on the lower housing 12. Throughout the cooking or heating process, the temperature sensing probe 26 continuously or intermittently monitors the internal temperature of the food item and sends a signal to the control unit that is indicative of the detected temperature. When the temperature sensing probe 26 detects the pre-set temperature, or a temperature corresponding to the desired degree of doneness as set by a user, the control unit automatically turns off the heating plates 14, 18 to prevent overcooking. In addition, after the desired temperature is reached, the control unit is configured to generate an audible alert, such as a beep, to indicate to a user that the food item is cooked to the desired doneness.

As will be readily appreciated, the cooking appliance 10 of the present invention therefore provides a level of control over the cooking or heating operations that has heretofore not been possible with existing devices. In particular, the configuration of existing cooking appliances typically requires that a user manually insert a meat thermometer into a food item and manually monitor the temperature of the food item. By automatically monitoring the internal temperature of the food throughout cooking, without having to open the appliance 10 or pause cooking, and by controlling operation of the cooking appliance 10 in dependence upon pre-set and detected temperatures, more precise cooking, and therefore better tasting food, is realized.

In addition, the cooking appliance 10 of the present invention provides a greater level of convenience by automatically monitoring the internal temperature of a food item without requiring constant attention by a user. Moreover, the ability to remove the temperature sensing probe 26 from the cooking appliance 10 allows for more convenient use and makes the probe 26 easier to clean.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A temperature sensing system for a cooking appliance, said temperature sensing system comprising:
   a temperature sensing probe being removably lockable to a cooking appliance said temperature sensing probe including a rotatable knob and a piercing shaft having a temperature sensor, said piercing shaft being extendable from a first position, in which said piercing shaft is substantially contained within said rotatable knob, to a second position, in which said piercing shaft extends out of said rotatable knob and protrudes into said cooking appliance;
   a control unit housed within said cooking appliance, said control unit selectively operating said cooking appliance in dependence upon data from said temperature sensing probe;
   wherein rotation of said rotatable knob effects the extension of said piercing shaft from said first position to said second position, and
   wherein said temperature sensing probe automatically locks to said cooking appliance and wherein movement of a lock button releases said temperature sensing probe from said cooking appliance;
   wherein when said temperature sensing probe is locked to said cooking appliance, an electrical connection is established between said temperature sensor within said piercing shaft of said temperature sensing probe and said control unit within said cooking appliance, and when said temperature sensing probe is removed from said cooking appliance, said electrical connection is broken.

2. A cooking appliance, said cooking appliance comprising:
   an upper housing having a first heating surface;
   a lower housing having a second heating surface;
   a temperature sensing probe in a temperature probe housing removably affixable to said upper housing and selectively extendable from said temperature probe housing through said upper housing and said first heating surface;
   wherein said temperature sensing probe may be selectively extended between a first position in which a distal tip of said temperature sensing probe containing a temperature sensor does not extend beyond said first heating surface, and a second position in which said distal tip of said temperature sensing probe does extend beyond said first heating surface, during operation of said cooking appliance, and
   wherein said temperature sensing probe automatically locks to said upper housing and wherein movement of a lock button of said upper housing releases said temperature sensing probe from said upper housing;
   wherein said temperature sensing probe is configured such that an electrical connection between said temperature sensor and a control unit of said cooking appliance is automatically established when said temperature sensing probe is locked to said upper housing; and
   wherein when said temperature sensing probe is removed from said upper housing, said electrical connection is severed.

3. A cooking appliance, said cooking appliance comprising:
   an upper housing having a first heating surface selectively contacting a food item,
   a lower housing having a second heating surface selectively contacting said food item, at least one of said first heating surface and said second heating surface being selectively movable with respect to the other of said first heating surface and said second heating surface;
   a temperature sensing probe removably connectable lockable to a receiver in said upper housing;
   said temperature sensing probe automatically locks to said receiver and movement of a lock button of said upper housing releases said temperature sensing probe from said receiver;
   wherein said temperature sensing probe includes a piercing shaft having a temperature sensor, said piercing shaft being extendable from a first position, in which said piercing shaft is substantially contained within said knob, to a second position, in which said piercing shaft extends further from said knob and through said first heating surface to pierce said food item;
   wherein said cooking appliance includes a locking mechanism having said lock button, said lock button being operatively connected to an actuating member,
   wherein activation of said lock button moves said actuating member to release said temperature sensing probe from said receiver.

4. The cooking appliance of claim 3, wherein:
   said temperature sensing probe includes at least one protrusion extending from said piercing shaft;
   wherein said at least one protrusion is received in an angled slot formed in said guide cylinder and a substantially vertical groove formed in said rotatable knob.

5. The cooking appliance of claim 3, wherein:
   said temperature sensing probe is selectively movable between a first position, in which said temperature probe extends through said first heating surface, and a second position, in which said temperature sensing probe is retracted and does not extend through said first heating surface.

* * * * *